United States Patent [19]

Meissner

[11] 4,317,727

[45] Mar. 2, 1982

[54] FLUID FILTER CARTRIDGE AND METHOD OF ITS CONSTRUCTION

[75] Inventor: Paul J. Meissner, Sun Valley, Calif.

[73] Assignee: Meissner Manufacturing Company, Inc., Sun Valley, Calif.

[21] Appl. No.: 160,906

[22] Filed: Jun. 18, 1980

[51] Int. Cl.³ ............................................. B01D 27/06
[52] U.S. Cl. ................................. 210/315; 29/163.5 F; 210/443; 210/497.1; 210/498; 210/493.1
[58] Field of Search ................ 29/163.5 F, 163.5 CW, 29/163.5 R; 210/317, 438, 440, 443, 493, 497.1, 487, 342, 338, 337, 493 R, 315, 498

[56] References Cited

U.S. PATENT DOCUMENTS

| | | | |
|---|---|---|---|
| 830,184 | 9/1906 | Smith | 210/487 |
| 1,304,493 | 5/1919 | Layne | 29/163.5 R |
| 1,815,344 | 7/1931 | Brinul | 29/163.5 |
| 2,132,011 | 10/1938 | Bennett et al. | 29/165.5 |
| 2,217,327 | 10/1940 | Zeidler, Jr. | 29/163.5 |
| 2,743,018 | 4/1956 | Belgarde | 210/440 |
| 2,864,505 | 12/1958 | Kaston | 210/487 |
| 3,049,240 | 8/1962 | Smith | 210/487 |
| 3,203,079 | 8/1965 | Smith et al. | 29/163.5 R |
| 3,276,108 | 10/1966 | White | 29/163.5 R |
| 3,279,043 | 10/1966 | Wirt | 29/163.5 R |
| 3,390,780 | 7/1968 | Bennett | 210/342 |
| 3,420,377 | 1/1969 | Vandersip | 210/342 |
| 3,813,743 | 6/1974 | Harrell | 29/163.5 |
| 3,988,244 | 10/1976 | Brooks | 210/440 |

Primary Examiner—Theodore A. Granger
Attorney, Agent, or Firm—Christie, Parker & Hale

[57] ABSTRACT

An insert for placement between concentric cylindrical filter elements comprises in a one-piece construction a tubular cylindrical body and pairs of parallel slits in the body each forming therebetween a strip of material connected to the remainder of the body at the ends of the strip. The strips are bowed inwardly away from the remainder of the body between their ends to form protrusions extending transversely from the remainder of the body.

12 Claims, 9 Drawing Figures

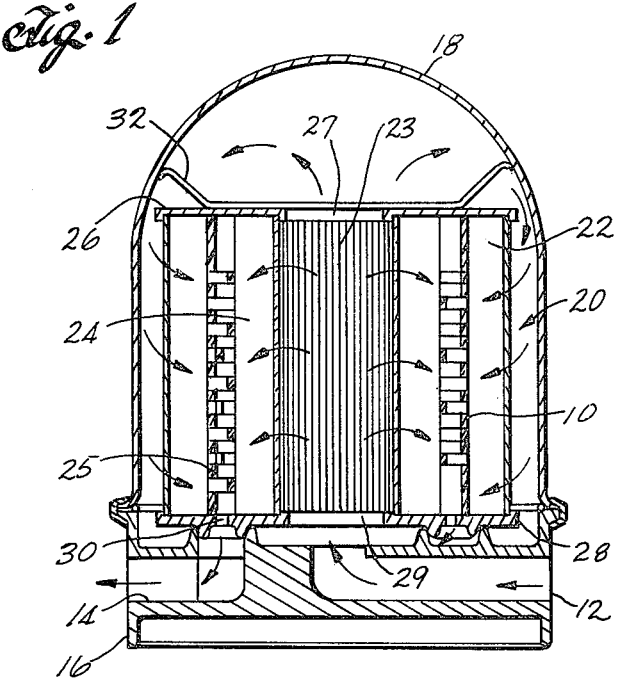
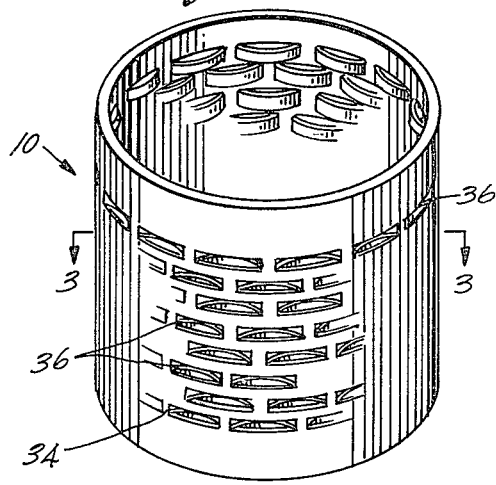
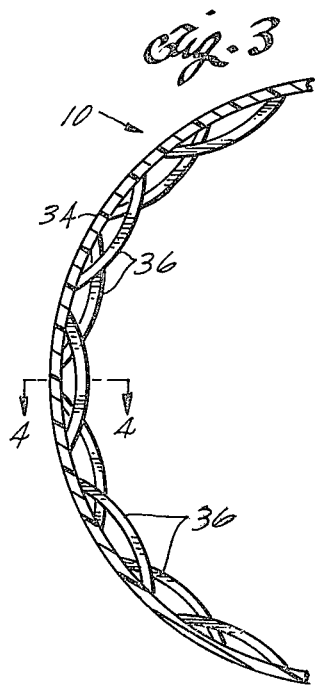

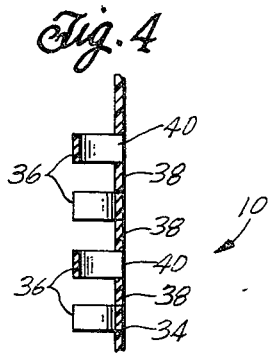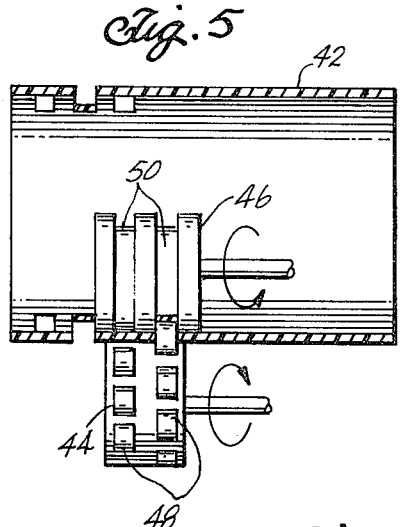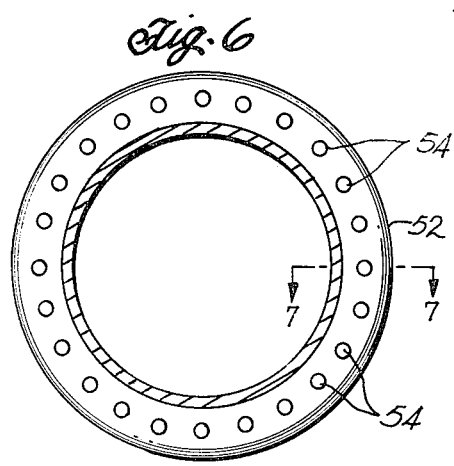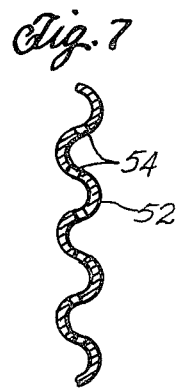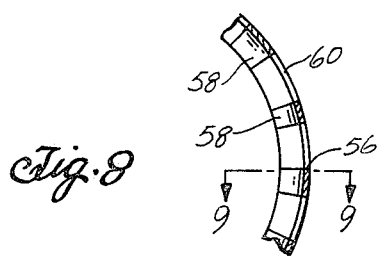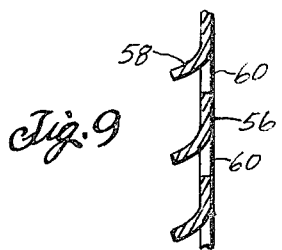

FLUID FILTER CARTRIDGE AND METHOD OF ITS CONSTRUCTION

BACKGROUND OF THE INVENTION

This invention relates to fluid filtering and, more particularly, to an insert for a filter cartridge and its method of construction.

One type of filter cartridge in common use employs inner and outer concentric cylindrical filter elements separated by an annular region. The cartridge is mounted in a housing having an inlet communicating with the outer surface of the outer filter element and the inner surface of the inner filter element and an outlet communicating with the annular region. Fluid flows radially inward through the outer filter element and radially outward through the inner filter element to the annular region and then flows axially through the annular region to the outlet. A problem of the described filter cartridge is the tendency of its filter elements to collapse toward the annular region due to the opposing forces exerted thereon by the inlet pressure. This tends to restrict fluid flow to the outlet and to reduce the useful life of the filter elements.

U.S. Pat. No. 3,988,244 teaches the use of a so-called fluid carrier element in the annular space between concentric filter elements in the form of a molded plastic mesh or netting wound about itself several times. The carrier element completely fills the annular region so as to function as a spacer in preventing collapse of the filter elements and permits transverse and axial fluid flow through the annular region by virtue of the openings in the mesh or netting.

SUMMARY OF THE INVENTION

One aspect of the invention is a tubular, preferably single-ply, insert disposed in the annular region between concentric inner and outer filter elements of the above-described type of filter cartridge. The insert has a side wall, perforations formed in the side wall to permit transverse flow through the insert from the filter elements to the annular region, and protrusions extending transversely from the side wall to permit longitudinal flow through the annular region; the side wall and the protrusions together form a spacer between the filter elements.

Another aspect of the invention is a method of constructing a fluid filter cartridge. A first annular pleated filter element having a small diameter is placed inside of a second annular pleated filter element having a large diameter so the elements are concentrically arranged with an annular region therebetween. Partial openings are cut in the side wall of a tubular insert, leaving flaps attached to the remainder of the side wall, and the flaps are permanently deformed away from the remainder of the side wall. The insert is placed in the annular region. The first and second elements and the insert are attached together to form a filter cartridge.

The described insert can be cheaply fabricated and provides a uniformly low, transverse and axial flow resistance in the region between the filter elements.

BRIEF DESCRIPTION OF THE DRAWINGS

The features of specific embodiments of the best mode contemplated of carrying out the invention are illustrated in the drawings, in which:

FIG. 1 is a side sectional view of a fluid filter assembly incorporating the principles of the invention;

FIG. 2 is a perspective view of the insert shown in FIG. 1;

FIG. 3 is a top sectional view of a portion of the insert of FIG. 1 taken through plane 3—3 of FIG. 2;

FIG. 4 is a side sectional view of a portion of the insert of FIG. 1 taken through plane 4—4 in FIG. 3;

FIG. 5 is a schematic view illustrating how the insert of FIG. 1 is fabricated;

FIG. 6 is a top sectional view of a portion of an alternative embodiment of the insert;

FIG. 7 is a side sectional view of a portion of the insert of FIG. 6 taken through plane 7—7 in FIG. 6;

FIG. 8 is a top sectional view of a portion of another alternative embodiment of the insert of FIG. 1; and FIG. 9 is a side sectional view of a portion of the insert of FIG. 8 taken through plane 9—9 in FIG. 8.

DETAILED DESCRIPTION OF THE SPECIFIC EMBODIMENTS

The filter assembly of FIG. 1 is, with the exception of an insert 10, constructed in the manner described in U.S. Pat. No. 3,988,244, the disclosure of which is incorporated fully herein by reference. An inlet 12 and an outlet 14 are formed in a base 16. Base 16 together with a dome-shaped cover 18 forms a housing for a filter cartridge 20. Cartridge 20 comprises an annular, preferably cylindrical, pleated filter element 22 having a large diameter and an annular, preferably cylindrical, pleated filter element 24 having a small diameter. Filter elements 22 and 24 are concentrically arranged with an annular region 25 therebetween filled by insert 10. A central passage 23 through cartridge 20 is defined by the inner surface of filter element 24. A rigid upper annular retaining plate 26, which has a central aperture 27, covers the upper ends of filter elements 22 and 24 and annular region 25. A rigid lower annular retaining plate 28, which has a central aperture 29, covers the lower ends of filter elements 22 and 24. Retaining plate 28 has a plurality of annular apertures 30 providing an exit from annular region 25. A strap 32, which is attached to cover 18, serves to seat filter element 20 on base 16 when cover 18 is in place so that central passage 23 lies in sealed communication with inlet 12 and annular apertures 30 lie in sealed communication with outlet 14.

In operation, as illustrated by the arrows, part of the fluid entering inlet 12 flows radially outward from central passage 23 through filter element 24 to annular region 25 and part of the fluid flows through central passage 23 to the outside of cartridge 20 and then radially inward through filter element 22 to annular region 25. From annular region 25, the fluid flows axially to outlet 14.

As depicted in FIGS. 2, 3, and 4, insert 10 comprises in a one-piece, preferably single-ply, construction a tubular cylindrical body 34 and protrusions extending transversely from the side wall of body 34 in the form of inwardly bowed strips of material 36. Strips 36 are formed by parallel slits in the side wall of body 34, leaving strips 36 connected to the side wall at their ends. The outer surface of the side wall of body 34 abuts the inner surface of filter element 22 and the inner surface of strips 36 abuts the outer surface of filter element 24. Thus, insert 10 serves as a spacer to hold filter elements 22 and 24 apart despite the opposing forces exerted thereon by the pressure difference. As illustrated in FIG. 2, strips 36 follow a helical path around the side wall of body 34. As illustrated in FIG. 4, adjacent strips 36 are laterally spaced from each other by portions 38 of the side wall of body 34. Each pair of parallel slits together with strip 36 formed thereby defines an aperture 40 for radial flow of fluid from filter element 22 into annular region 25. Fluid is free to flow radially outward from filter element 24 into annular region 25 in the regions of insert 10 where strips 36 are connected to the side wall of body 34. As illustrated in FIGS. 2 and 3, adjacent strips 36 are arranged in staggered rows and columns to equalize axial flow resistance around the annular region. Strips 36 thus serve as spacers between filter elements 22 and 24 that present a uniformly small axial and radial flow resistance.

Insert 10 could be fabricated by a punch and die operation from commercially available thin walled plastic PVC pipe, for example pipe with a 6″ diameter and 1/16″ wall thickness. As illustrated in FIG. 5, the side wall of a blank 42 in the form of PVC pipe is clamped between a rotatably driven punch wheel 44 and a die wheel 46. Punch wheel 44 has two circumferential rows of bowed cutting teeth 48 for cutting parallel slits in the side wall of blank 42 and permanently deforming the flaps of material formed thereby radially inward to form strips 36 of insert 10. Each row of teeth 48 is arranged in a circle around wheel 44 and lies in a plane perpendicular to the axis of blank 42. Teeth 48 have sharp side edges for cutting the parallel slits in the side wall of blank 42 and ends merging into wheel 44 so the flaps of material remain connected to the side wall of blank 42 at their ends. Die wheel 46, which is freely rotatable, has two circular grooves 50, which are aligned with teeth 48. Blank 42 is supported manually by a guide not shown so it is fed between wheels 44 and 46 with its axis at a small angle, i.e., 10° to 15°, with the vertical plane in which the axes of wheels 44 and 46 lie. This causes teeth 48 to traverse a helical path around blank 42. The axis of blank 42 lies in a plane perpendicular to the vertical plane. As punch wheel 44 is rotatable driven, blank 42 and die wheel 46 rotate and blank 42 translates axially, while teeth 48 enter grooves 50, thereby cutting the deforming blank 42 to form insert 10.

In a typical embodiment, strips 36 would have a length of between ¾ in. and 1⅛ in. and a width of between 3/16 in. and ¼ in.; the spacing between the outer surface of the side wall of body 34 and the inward facing surface of strips 36 is ⅜ in.; the spacing between adjacent strips 36 is 3/16 in.; and the spacing between strips 36 of a row is 3/16 in. These dimensions may, of course, vary with the conditions.

To construct filter cartridge 20, insert 10 is first fabricated in the manner described above in connection with FIG. 5. Next, filter element 24 is placed into filter element 22 so the elements are arranged concentrically with annular region 25 therebetween. Then, insert 10 is placed in the annular region. Finally, filter elements 22 and 24 and insert 10 are attached together by bonding retaining plates 26 and 28 to the ends of filter elements 22 and 24.

An alternative embodiment of insert 10 is shown in FIGS. 6 and 7. A tubular body 52 has a side wall with annular corrugations, which serve as spacers for the concentric filter elements and channels for transverse flow through annular region 25. Perforations 54 are formed in the side wall of body 52 midway between the crests of the corrugations to permit axial flow through annular region 25.

Another alternative embodiment of insert 10 is shown in FIGS. 8 and 9. A tubular body 56 has cuts producing flaps in the form of louvers 58 and apertures 60. Louvers 58 have one edge connected to the side wall of body 56 and an opposite edge extending transversely therefrom. Preferably, louvers 58 in each row are wider than the spacing between adjacent louvers in the row and louvers in adjacent rows are staggered in analogous fashion to strips 36 so as to equalize axial flow resistance around the annular region. Thus, louvers 58 serve as spacers between the concentric filter elements and apertures 60 permit radial fluid flow from the filter element to the annular region.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, the described insert could be employed to space a single filter element from an impervious annular element as depicted in FIG. 4 of U.S. Pat. No. 3,988,244. Although it is preferable to use a single-ply insert, some features of the invention are applicable to multiple-ply inserts. Strips 36 could extend all the way to the end of body 34 instead of as shown in FIG. 2.

What is claimed is:

1. A fluid filter assembly comprising:
   a housing having an inlet and an outlet;
   a filter cartridge including inner and outer annular elements disposed in the housing, the inner surface of the inner element and the outer surface of the outer element being in communication with the inlet, at least one of the elements comprising a pleated filter, the inner and outer elements being separated to define therebetween an annular region communicating with the outlet; and
   the improvement characterized by a single-ply tubular insert disposed in the annular region between the inner and outer elements, the insert having a side wall, perforations formed in the side wall to permit transverse flow through the insert from the pleated filter to the annular region, and protrusions extending transversely from the side wall to permit longitudinal flow through the annular region, the side wall and the protrusions together forming a spacer between the elements.

2. The filter assembly of claim 1, in which both the inner and outer elements comprise pleated filters.

3. The filter assembly of claim 2, in which the perforations comprise pairs of parallel slits each forming therebetween a strip of material connected to the side wall at the ends of the strip, the strips being bent away from the side wall between their ends to form the protrusions.

4. The filter assembly of claim 3, in which the strips extend inwardly away from the side wall.

5. The filter assembly of claim 4, in which the strips follow a helical path around the side wall.

6. The filter assembly of claim 5, in which adjacent strips are laterally spaced from each other.

7. The filter assembly of claim 6, in which the strips are arranged in staggered rows and columns to equalize axial flow resistance around the annular region.

8. The filter assembly of claim 1, in which the perforations each comprise a cut in the side wall of the insert forming a louver with one edge attached to the insert and an opposite edge bent away from the side wall of the insert to form the protrusions.

9. The filter assembly of claim 1, in which the insert has annular corrugations forming the protrusions.

10. The filter assembly of claim 9, in which the perforations are located midway between the crests of the corrugations.

11. A method of constructing a fluid filter cartridge comprising the steps of:

cutting partial openings in the side wall of a tubular insert leaving flaps attached to the remainder of the side wall, and permanently deforming the flaps away from the remainder of the side wall;

placing a first annular pleated filter element having a small diameter inside of a second annular pleated filter element having a large diameter so the elements are concentrically arranged with an annular space lying therebetween;

placing the insert in the annular region; and attaching the first and second elements and the insert together.

12. The method of claim 11, in which the cutting step comprises cutting pairs of parallel slits in the body, leaving as the flaps strips of material connected to the remainder of the body at their ends and bowed away from the remainder of the body between their ends.

* * * * *